United States Patent [19]

Lucas

[11] Patent Number: 4,652,903

[45] Date of Patent: Mar. 24, 1987

[54] FREQUENCY GENERATION FOR MULTIPLEXED ANALOG COMPONENT COLOR TELEVISION ENCODING AND DECODING

[75] Inventor: Keith Lucas, Ontario, Canada

[73] Assignee: Scientific Atlanta, Inc., Atlanta, Ga.

[21] Appl. No.: 652,926

[22] Filed: Sep. 21, 1984

[51] Int. Cl.$^4$ ............................................. H04N 11/06
[52] U.S. Cl. ........................................ 358/11; 358/13; 358/110
[58] Field of Search ..................... 358/11, 12, 13, 14, 358/141, 142, 143, 146, 140; 370/109; 375/122; 381/34

[56] References Cited

U.S. PATENT DOCUMENTS

| | | | |
|---|---|---|---|
| 3,571,494 | 3/1971 | Law | 178/6 |
| 3,781,463 | 12/1973 | Van den Bussche | 178/5.4 CD |
| 3,789,137 | 1/1974 | Newell | 358/143 X |
| 4,245,235 | 1/1981 | Poetsch | 358/14 |
| 4,335,393 | 6/1982 | Pearson | 358/11 X |
| 4,514,760 | 4/1985 | Balaban | 358/143 |
| 4,516,150 | 5/1985 | Gurley | 358/13 |
| 4,544,950 | 10/1985 | Tu | 358/143 |
| 4,549,224 | 10/1985 | Nakamura et al. | 358/310 |

FOREIGN PATENT DOCUMENTS

| | | | |
|---|---|---|---|
| 103339 | 3/1984 | European Pat. Off. | |
| WO830394 | 11/1983 | PCT Int'l. Appl | |
| 8402442 | 6/1984 | United Kingdom | 358/13 |
| 2144298A | 2/1985 | United Kingdom | |
| 2144300A | 2/1985 | United Kingdom | |

OTHER PUBLICATIONS

K. Lucas and M. D. Windram, "Direct Television Broadcasts by Satellite-Desirability of a New Transmission Standard", IBA report, Sep. 1981, pp. 1-19.

T. S. Robson, "Extended-definition television service", IEE Proc., vol. 129, Pt. A, No. 7, Sep. 1982, pp. 485-492.

K. Lucas, "Progress Report on Investigations of Digital YUV Chroma-Key" Independent Broadcasting Authority, EBU WBV SGVI-VID, Apr. 9, 1980.

A. Goldberg, et al., "A Two Channel Compatible HDTV Broadcast System", CBS Technical Center Report 8/83-A, Jul. 29, 1983.

*Primary Examiner*—Michael A. Masinick
*Attorney, Agent, or Firm*—Banner, Birch, McKie & Beckett

[57] ABSTRACT

In a Multiplexed Analog Component (MAC) color television transmission system in which the MAC signal is to be converted at the receiver to a composite color television signal having a 227.5 $f_H$ color subcarrier, frequency-generation equipment required at the receiver is simplified by selecting the various frequencies in accordance with the following relationship, $$(f_0/n) = (3f_1/2) = 3f_2 = f_4 = 227.5k\, f_H,$$

where:
  $f_0$ is the master clock frequency,
  $f_1$ is the luminance sampling frequency,
  $f_2$ is the chrominance sampling frequency,
  $f_4$ is the MAC sampling frequency,
  $f_h$ is the horizontal line frequency, and
  n and k are positive integers.

16 Claims, 8 Drawing Figures

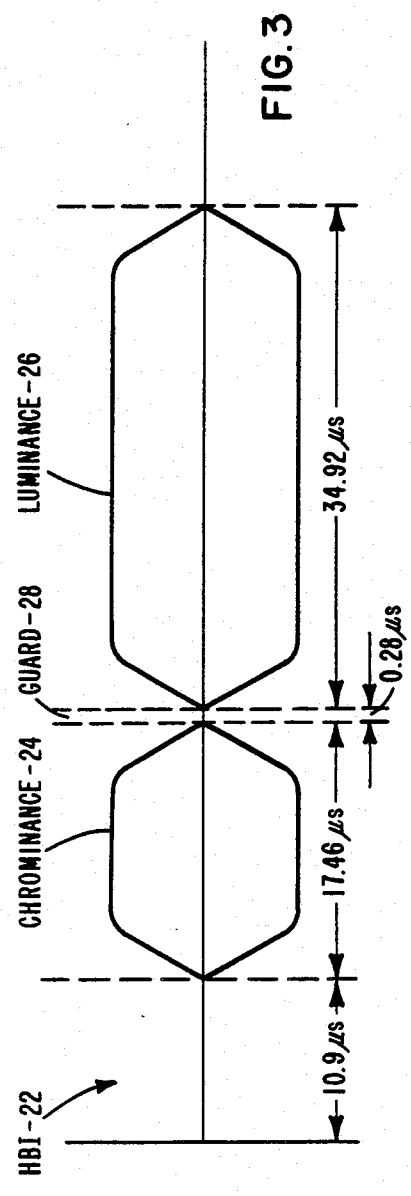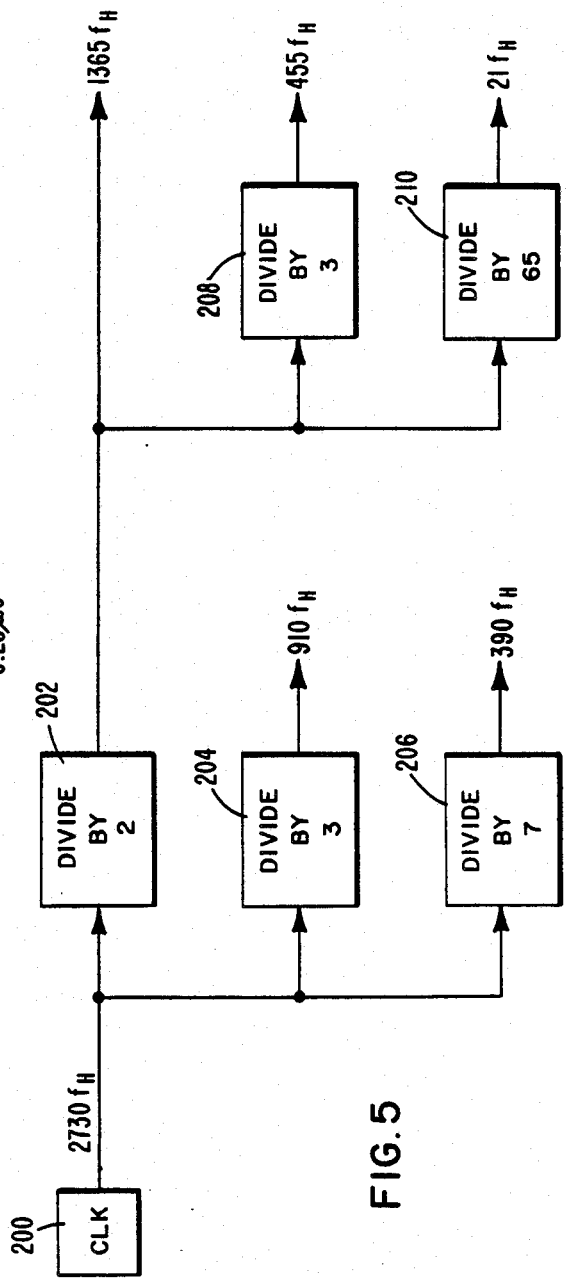

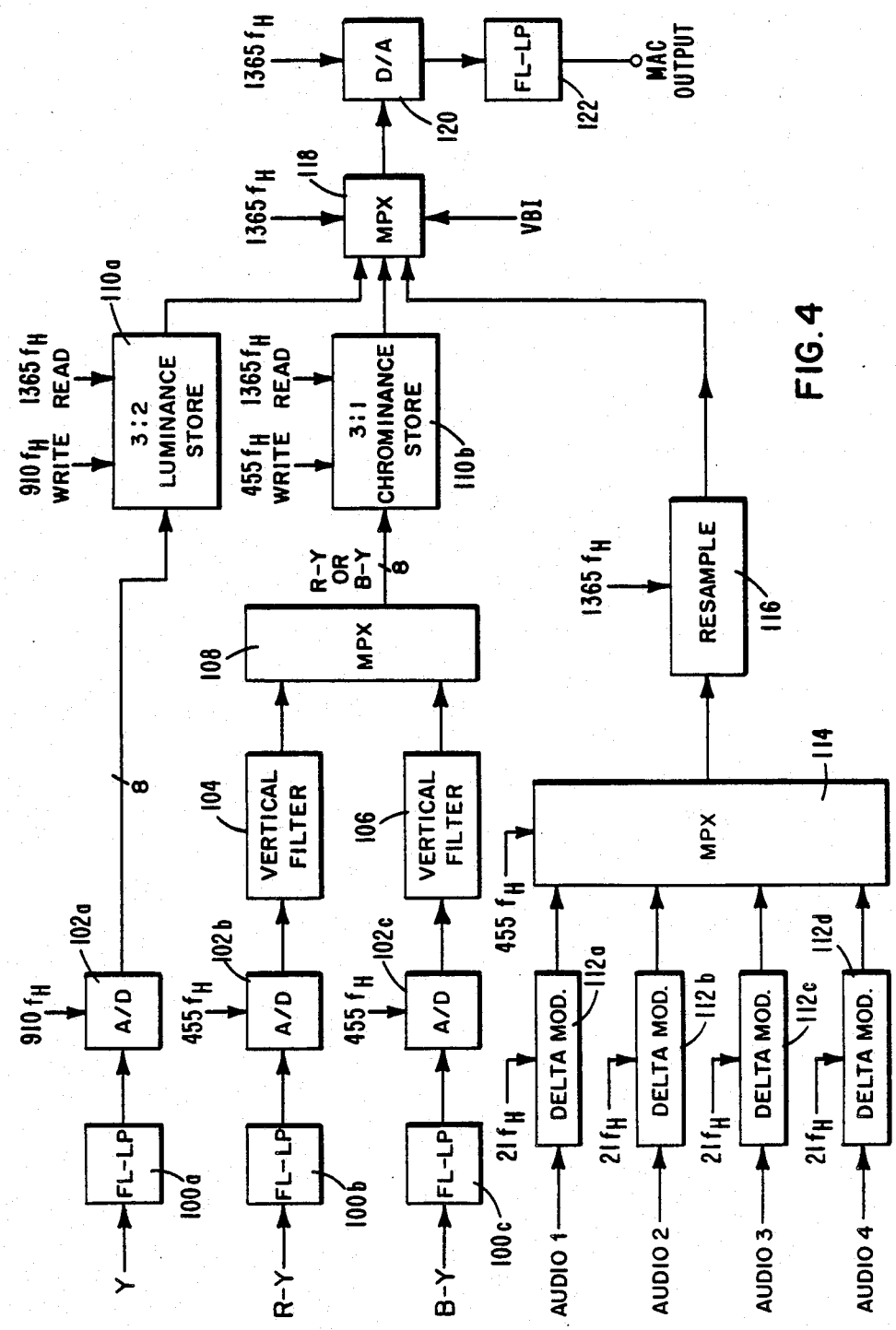

FREQUENCY GENERATION FOR MULTIPLEXED ANALOG COMPONENT COLOR TELEVISION ENCODING AND DECODING

BACKGROUND OF THE INVENTION

This inventon relates to the transmission and reception of color television.

In the United States, color broadcasts are made according to National Television Systems Committee (NTSC) composite standards, which require that picture information be separated into two components: luminance, or brightness, and chrominance, or color. FIG. 1 is an amplitude-vs.-frequency diagram illustrating in simplified form a typical NTSC composite color television signal 10 comprising a luminance signal 12 and a chrominance signal 14. (A composite television signal is one in which chrominance information is carried on a subcarrier. Other composite signals are SECAM, which is used in France, and PAL, which pre-dominates in the rest of Europe.) The signal occupies a nominal bandwidth of 6 MHz with the picture carrier 16 being 1.25 MHz above the lower end of the band. Luminance information is modulated directly onto picture carrier 16, while chrominance information is modulated onto color subcarrier 18 which is in turn used to modulate picture carrier 16. Color subcarrier 18 has a frequency of 3.579545 MHz, a standard established by the NTSC. (Audio information is carried on another subcarrier 20 lying near the upper edge of the band.)

The region labelled A in FIG. 1 is of particular importance, for it represents overlap between the luminance 12 and chrominance 14 signals. Since separation of luminance and chrominance is accomplished by filtering a frequency-division multiplexed signal, overlaps such as A between the two signals lead to several problems. If, upon reception, complete separation between luminance and chrominance is desired, the necessary filtering will cause the loss of some of the information in both signals. On the other hand, if no loss of information can be tolerated, then one must accept interference between the luminance and chrominance signals. Moreover, since the various parts of the NTSC television signal are transmitted at different frequencies, phase shifts occurring during transmission will affect them differently, causing the signal to deteriorate. Also, the available color information is severely limited by the small color bandwidth permitted.

To overcome these problems, a system called Multiplexed Analog Components (MAC) has been developed. The MAC color television signal is illustrated in FIG. 2, which is an amplitude-vs.-time diagram of a single video line of 63.56 us duration. The first 10.9 us is the horizontal blanking interval (HBI) 22, in which no picture information is transmitted. Following HBI 22 are chrominance signal 24 and luminance signal 26, either of which may be time-compressed. Between chrominance signal 24 and luminance signal 26 is a 0.28 us guard band 28, to assist in preventing interference between the two signals.

The MAC color television signal of FIG. 2 is obtained by generating conventional luminance and chrominance signals (as would be done to obtain a conventional NTSC or other composite color television signal) and then sampling and storing them separately. Luminance is sampled at a luminance sampling frequency and stored in a luminance store, while chrominance is sampled at a chrominance sampling frequency and stored in a chrominance store. The luminance or chrominance samples may then be compressed in time by writing them into the store at their individual sampling frequency and reading them from the store at a higher frequency. A multiplexer selects either the luminance store or the chrominance store, at the appropriate time during the active video line, for reading, thus creating the MAC signal of FIG. 2. If desired, audio samples may be transmitted during the HBI; these are multiplexed (and may be compressed) in the same manner as the video samples. The single rate at which all samples occur in the multiplexed MAC signal is called the MAC sampling frequency.

Although the MAC format of FIG. 2 overcomes the problems of the composite television signal of FIG. 1, these have been replaced by several other difficulties. One physical embodiment of a prior art MAC system having acceptable picture quality uses a luminance sample frequency of 13.50 MHz, compressing luminance in the ratio of 3:2. The MAC sample frequency is therefore 20.25 MHz. However, the NTSC horizontal line frequency $f_H$ (for a 63.56 us line) is 0.01573 MHz, which is 1/1287th of the MAC sample frequency used in this system. Therefore, since all three frequencies must be generated in each of the many receivers which would receive this signal, complicated and expensive frequency-generation circuitry must be used at each receiver to regenerate the color subcarrier and other necessary frequencies, adding greatly to the cost of such a system. (All composite color television signals use a color subcarrier frequency of 227.5 $f_H$; however, $f_H$ in each system is different. Therefore, only in an NTSC signal will the 227.5 $f_H$ color subcarrier have a frequency of 3.579545 MHz.)

Another physical embodiment of a prior art MAC system uses a luminance sample frequency of 10.74 MHz (682.5 $f_H$) and compresses luminance in the ratio of 4:3. The MAC sample frequency is therefore 14.32 MHz (910 $f_H$). This system, in addition to the complicated frequency-generation circuitry required in the receivers, has unacceptable picture quality because of the low luminance sample frequency and, therefore, cannot satisfy the commercial requirements and Nyquist criterion for desired luminance bandwidth.

A third physical embodiment of a prior art MAC system uses a MAC sample frequency of 21.48 MHz (1365 $f_H$) and a luminance compression ratio of 5:4. Luminance sampling is therefore done at 17.18 MHz (1092 $f_H$), which does provide acceptable picture quality. However, once again, complicated frequency-generation circuitry is required. Furthermore, if both luminance and chrominance are to fit into an active video line of the same length as an NTSC active video line (52.38 us), chrominance must then be compressed in the ratio 5:1. The chrominance signal quality is then unacceptable because of noise. A variation of this prior art system compresses chrominance in the ratio 15:4 to avoid the noise problem; but this simply adds to the complexity of the frequency-generation circuitry and extends luminance and chrominance beyond the active video line into the horizontal blanking interval, with the result that insufficient time remains in each video line for the necessary audio information.

Adding to the complexity of frequency generation is the requirement that a color subcarrier at a frequency of 227.5 $f_H$ (3.579545 MHz for NTSC) be generated at each receiver. A technique for easily generating the subcarrier without high cost is required. Because standard receivers are constructed to receive composite television signals, they cannot directly receive a MAC television signal. The MAC signal used for transmission must first be converted to a composite television signal (such as NTSC, PAL, or SECAM) at the receiver.

SUMMARY OF THE INVENTION

It is therefore an object of the present invention to simplify, and therefore reduce the cost of, the frequency-generation circuitry required at each receiver in a communication system for transmitting MAC color television signals to receivers where they are converted to composite television signals.

Another object of the present invention is to sample luminance and chrominance at a sufficiently high frequency to produce a picture of acceptable quality.

Another object of the present invention is to compress both luminance and chrominance in such a way that both signals fit into an active video line without extending into the HBI (thereby allowing sufficient time to transmit the necessary audio information in the HBI).

Another object of the present invention is not to compress luminance or chrominance to such an extent that picture quality is unacceptable because of noise.

The invention satisfies these and other objects by realizing a set of frequencies (to be used as sample frequencies and for other purposes) so related to each other that all can be derived, by dividing by relatively low integer values, from a single master clock frequency. Because no frequency multiplication is involved (which would be the case if certain of the selected frequencies could not be evenly divided into the master clock frequency), only a single phase-locked loop is required—to control the master clock frequency. This feature of the invention sharply reduces the cost of the equipment which must be used at each receiver.

It has been found that, for acceptable quality television signals which satisfy commercial requirements and the Nyquist criterion, luminance should be sampled at a rate at least as high as 12 MHz, while the minimum rate for chrominance sampling is 5 MHz. The upper limit of sampling frequencies in general, it has been found, is established by existing low-cost integrated circuit technology at about 20 MHz; therefore, when transmitting MAC television signals, the product of the basic (luminance or chrominance) sampling frequency and the compression ratio, that is, the MAC sampling frequency, may not be much greater than this figure.

Since audio information will accompany the composite color television signal which is ultimately delivered to the receiver, audio samples are included in the MAC color television signal. Therefore, the audio sample frequency is also selected to be evenly divisible into the master clock frequency.

If teletext is desired, a signal near 6 MHz must be generated at the receiver to allow the use of standard "dot-matrix" teletext character generators. Once again, the exact frequency of this signal should be evenly divisible into the master clock frequency.

The frequencies selected as part of this invention are related in the following way, where n and k are positive integers (and $f_H$ is the horizontal line frequency):

$$(f_0/n) = (3f_1/2) = 3f_2 = 65f_3 = f_4 = 227.5k\, f_H.$$

As can be seen from the coefficients, each of the signals (including the color subcarrier at 227.5 $f_H$) is derivable from the master clock signal solely by division by low, positive integers. (In some cases, several such dividers would be used. For example, the audio sampling signal $f_3$ might be generated by dividing the master clock signal by 5n and then dividing the resulting signal by thirteen.) This allows the use of a single phase-locked loop and simple dividers at the receiver, greatly simplifying the frequency-generation circuitry.

Acceptable picture quality is produced by making both the luminance sampling frequency ($f_1$) and the chrominance sampling frequency ($f_2$) greater than the minima (12 MHz and 5 MHz, respectively) found necessary for acceptable picture quality.

The compression ratio for luminance ($f_4/f_1$) is 3:2. The compression ratio for chrominance ($f_4/f_2$) is 3:1. Therefore, the compressed luminance and chrominance signals will fit into the active video line without extending into the HBI. Nevertheless, neither compression ratio is so high that an unacceptably noisy picture results.

Within the foregoing constraints, the MAC sampling frequency $f_4$ can remain low enough so that existing inexpensive video A/D converters or CCD's can be used at the receiver, ensuring a low total cost for hardware.

The invention is implemented in a centrally-located encoder, which converts a color television signal including luminance and chrominance into a MAC color television signal, and a decoder at each receiver, which converts the MAC color television signal to a composite color television signal. The signal may then be transmitted over the greater part of its transmission path in the more advantageous MAC format.

The encoder receives a television signal comprising separate luminance and chrominance components. These components are sampled, in a known manner, at the appropriate (luminance or chrominance) sampling frequency. Luminance samples are compressed in the ratio 3:2 by writing them into a store at $f_1$ (the luminance sampling frequency) and reading them from the store at $f_4$ (the MAC sampling frequency). Chrominance samples are compressed in the ratio 3:1 by reading them into a store at $f_2$ (the chrominance sampling frequency) and reading them from the store at $f_4$. The samples are read alternately from the stores (and combined with any other desired signals, such as audio samples) by a multiplexer to produce the MAC color television signal which is transmitted to each receiver.

At each receiver, the decoder includes a demultiplexer which separates the several components from the MAC signal. Luminance and chrominance are decompressed by reversing the process by which they were compressed; and audio or other information is also recovered.

Chrominance samples are used in a known manner to modulate the 227.5 $f_H$ color subcarrier generated in the decoder. The decompressed luminance samples and modulated subcarrier are then combined with appropriate synchronization and blanking information into composite color television signal.

Within the HBI, several audio channels may be transmitted using time-division multiplexing. Also, teletext information may be transmitted in the vertical blanking interval (VBI) in a manner well known in the art. Teletext codes are recovered in the receiver and input to a character generator which produces the alphanumeric characters for display on the television screen.

BRIEF DESCRIPTION OF THE DRAWINGS

FIG. 3 is an amplitude-vs.-time diagram of a single video line of a MAC color television signal transmitted in accordance with the present invention.

FIG. 4 is a diagram of the encoder used with the present invention.

FIG. 5 is a diagram of the circuitry used to generate the various frequencies required in both the encoder and the decoder.

DETAILED DESCRIPTION OF THE PREFERRED EMBODIMENT

Figure 1:
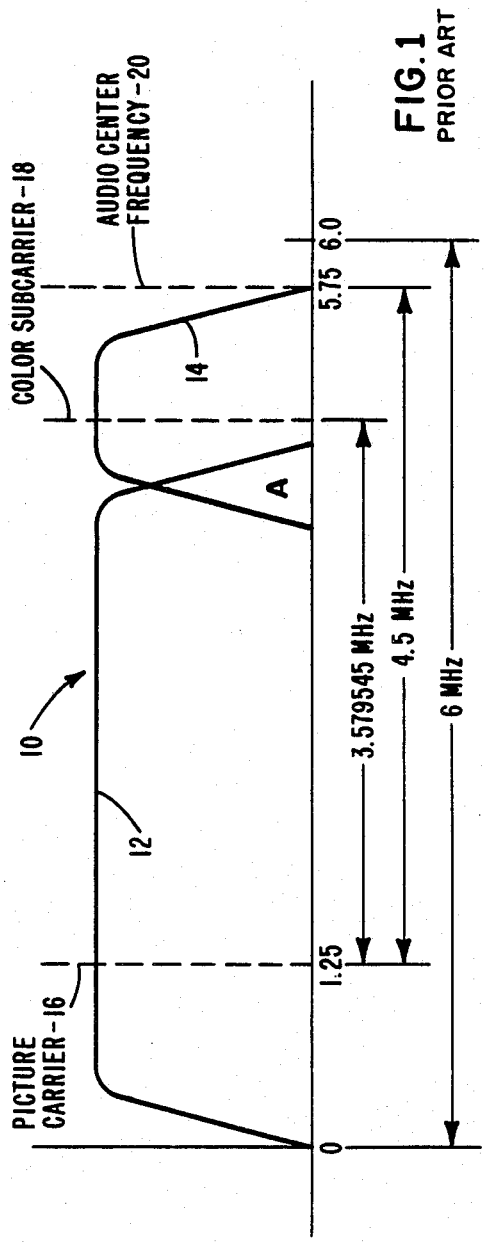
FIG. 1 is an amplitude-vs.-frequency diagram illustrating in simplified form a typical NTSC color television signal.
Figure 2:
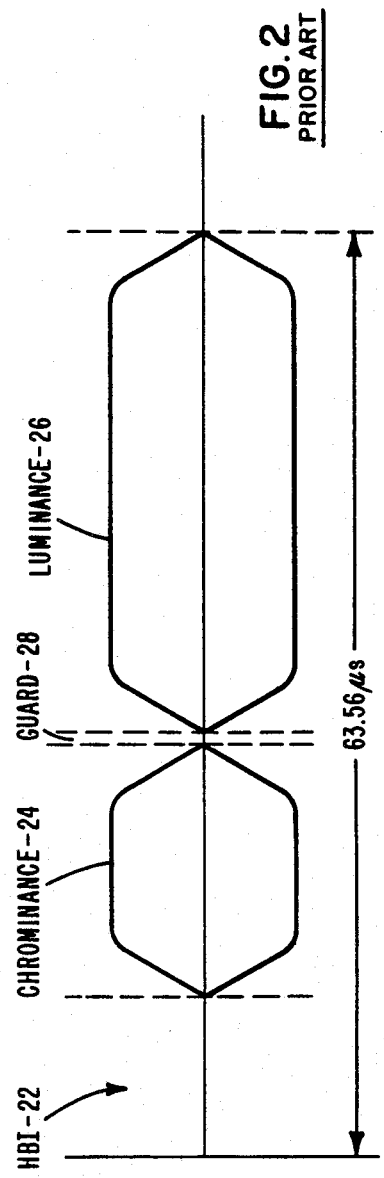
FIG. 2 is an amplitude-vs.-time diagram of a single video line of a typical MAC color television signal.

Table 1 gives the frequencies selected for use with the preferred embodiment of the invention. Although the invention is illustrated using the NTSC color subcarrier, 3.579545 MHz, and converting the MAC signal at the receiver to an NTSC signal, PAL or SECAM could be used instead.

TABLE 1

| Signal | Frequency | Fraction of Master Clock |
|---|---|---|
| Master Clock ($f_0$) | 42.95 MHz = 2730 $f_H$ | 1 |
| Luminance Sampling ($f_1$) | 14.32 MHz = 910 $f_H$ | ⅓ |
| Chrominance Sampling ($f_2$) | 7.16 MHz = 455 $f_H$ | 1/6 |
| Audio Sampling ($f_3$) | 0.33 MHz = 21 $f_H$ | 1/130 |
| MAC Sampling ($f_4$) | 21.48 MHz = 1365 $f_H$ | ½ |
| Teletext Generator ($f_5$) | 6.14 MHz = 390 $f_H$ | 1/7 |
| NTSC Color Subcarrier | 3.579545 MHz = 227.5 $f_H$ | 1/12 |

(Frequency $f_3$ may also be 0.20 MHz, or 13 $f_H$, which is 1/210 of $f_0$.)

FIG. 3 is an amplitude-vs.-time diagram of a single video line transmitted in accordance with the present invention. HBI 22 is substantially the same length, 10.9 us, as it would be in an NTSC video line. Chrominance signal 24, having been compressed in the ratio 3:1, lasts only 17.46 us, and luminance signal 26, compressed 3:2, lasts 34.92 us. A 0.28 us guard band 28 separates the two signals.

FIG. 4 is a block diagram of the encoder used with the present invention. Three color television signals, luminance (Y) and two color difference signals (R−Y and B−Y) are delivered from a conventional color television source and are filtered, respectively, in low-pass filters 100a, 100b and 100c. The filtered color television signals are then sampled at the appropriate rate (910 $f_H$ for luminance and 455 $f_H$ for each of the chrominance signals) in A/D converters 102a, 102b, and 102c.

Vertical filters 104 and 106 provide vertical interpolation of the digital color difference signals Y−Y and B−Y, respectively, after which these signals are selected alternately for transmission by multiplexer 108. As in NTSC television transmission, only one of the two color difference signals is sent as chrominance in each line of MAC television.

The digital luminance and chrominance signals are next compressed as described above. Luminance data are written into luminance store 110a (a CCD line store) at 910 $f_H$, the luminance sampling frequency, and read from the store at 1365 $f_H$, the MAC sampling frequency. Chrominance data are written into chrominance store 110b (also a CCD line store) at 455 $f_H$, the chrominance sampling frequency, and read from the store at 1365 $f_H$.

During the time when color television signals are being processed, the accompanying audio information is also sampled and compressed for transmission. Four audio channels, 1 through 4, are sampled and digitized at 21 $f_H$ in delta modulators 112a–112d. (If six audio channels are desired, they may be sampled at 13 $f_H$.) The four channels of delta-modulated audio are then alternately selected for transmission, and compressed to 455 $f_H$, by multiplexer 114. After compression, the audio is resampled at 1365 $f_H$, the MAC sampling frequency, in sampling circuit 116.

The information transmitted in the VBI, synchronization, timing, and teletext, is represented in FIG. 4 by the arrow labelled "VBI." This information is generated in a conventional manner and delivered to multiplexer 118 at the MAC sampling frequency.

Multiplexer 118 receives four sets of signals, luminance, chrominance, audio, and synchronization, timing and teletext, all occurring at the MAC sampling frequency. Multiplexer 118 then combines these signals by selecting them at the appropriate time for inclusion in the MAC video line. After multiplexing, the signals are reconverted to analog in D/A converter 120, filtered in low-pass filter 122, and output as a MAC color television signal.

FIG. 5 is a block diagram of the circuitry used to generate the various frequencies required in both the encoder and the decoder. Master clock 200 includes a phase-locked loop and generates the master clock signal at 2730 $f_H$. This signal is sent to three dividers. Divider 202 divides the master clock signal by two; divider 204 divides the master clock signal by three; and divider 206 divides the master clock signal by seven. The output of divider 204, at a frequency of 910 $f_H$, is the luminance sampling signal. The output of divider 206, at 390 $f_H$, is the teletext generator signal. The 1365 $f_H$ signal produced by divider 202 is used alone, as the MAC sampling signal, and also divided again by dividers 208 and 210. Divider 208, dividing the MAC sampling signal by three, produces the 455-$f_H$ chrominance sampling signal; while divider 210, dividing by 65, produces the 21-$f_H$ audio sampling signal.

Figure 6:
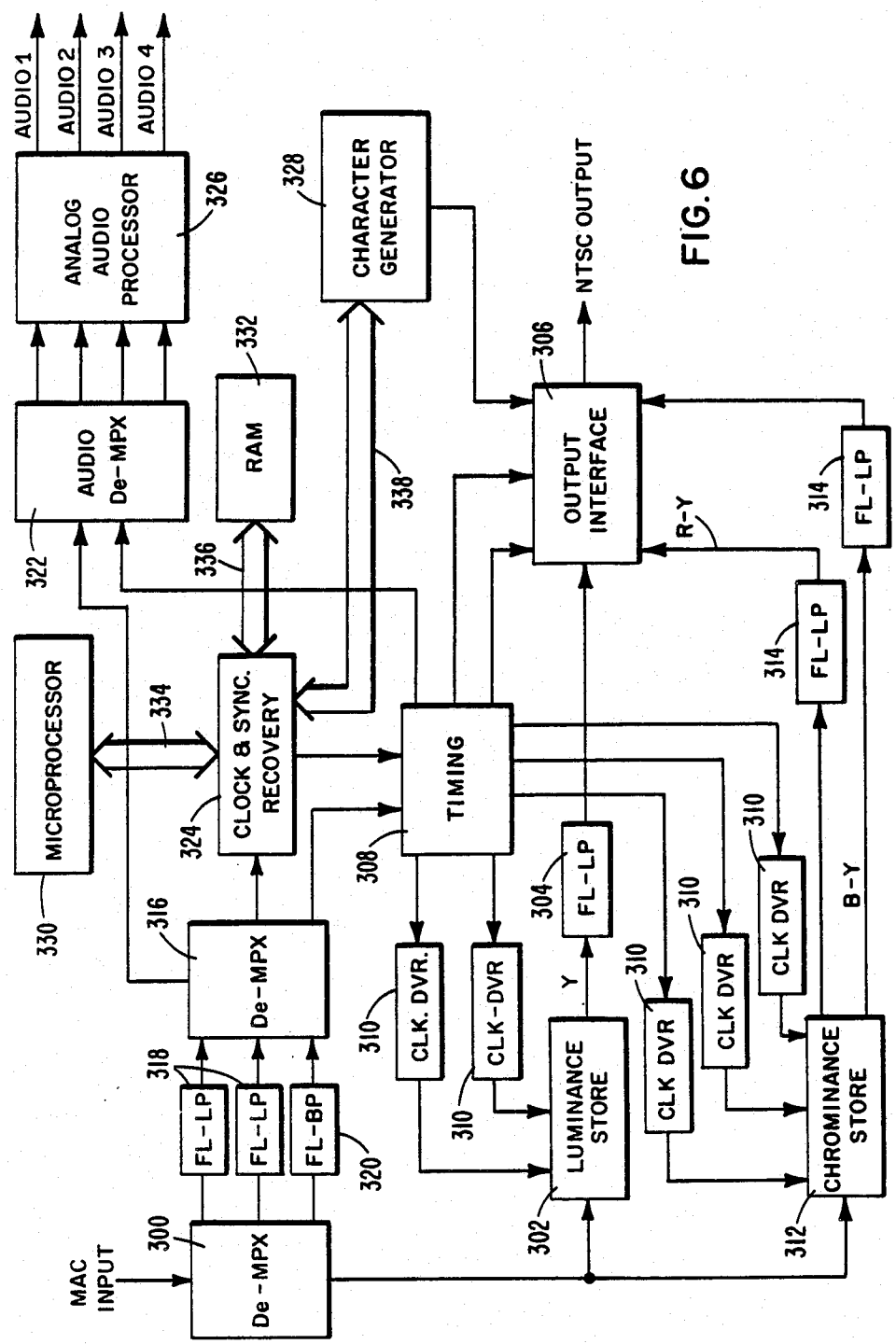
FIG. 6 is a diagram of the decoder used with the present invention.

FIG. 6 is a block diagram of the decoder used with the present invention. The MAC television signal first enters the demultiplexer 300, which separates from it the luminance and chrominance signals as well as the audio, synchronization, timing and teletext information. The luminance signal is delivered to luminance store 302, a CCD line store, where it is decompressed, and then to low-pass filter 304, where it is filtered. The analog luminance signal then goes to output interface 306. The sampling signals necessary to decompress luminance are produced in timing generator 308 and supplied to luminance store 302 by two clock drivers 310.

The chrominance signal from demultiplexer 300 is also decompressed in chrominance store 312, which is also a CCD line store. Separate outputs are provided for the two color difference signals, which are filtered in two low-pass filters 314 and then supplied to output interface 306. The necessary sampling signals are supplied to chrominance store 312 from timing generator 308 through three clock drivers 310.

Signals not constituting luminance or chrominance are also separated from the MAC television signal by demultiplexer 300. These signals include audio, teletext and sychronization and timing information. Audio, teletext, and synchronization signals are delivered to demultiplexer 316 through one of two low-pass filters 318; while the fixed-frequency timing information is delivered to demultiplexer 316 through band-pass filter 320. Demultiplexer 316 separates these signals, supplying the audio to audio demultiplexer 322 and the synchronization and timing signals to clock and synchronization recovery circuit 324 and timing generator 308. Audio information from demultiplexer 316 is separated into four channels in audio demultiplexer 322 and output by analog audio processor 326. Teletext information is sent to character generator 328 via clock and synchronization recovery circuity 324. Decoder operations are under the control of microprocessor 330, which communicates with clock and synchronization recovery circuit 324, teletext character generator 328, and RAM 332 over bidirectional buses 334, 338 and 336, respectively, Output interface 306 receives teletext characters from character generator 326, luminance from low-pass filter 304, chrominance from low-pass filters 314, and timing signals from timing generator 308. Its output is a standard NTSC color television signal.

Figure 7:
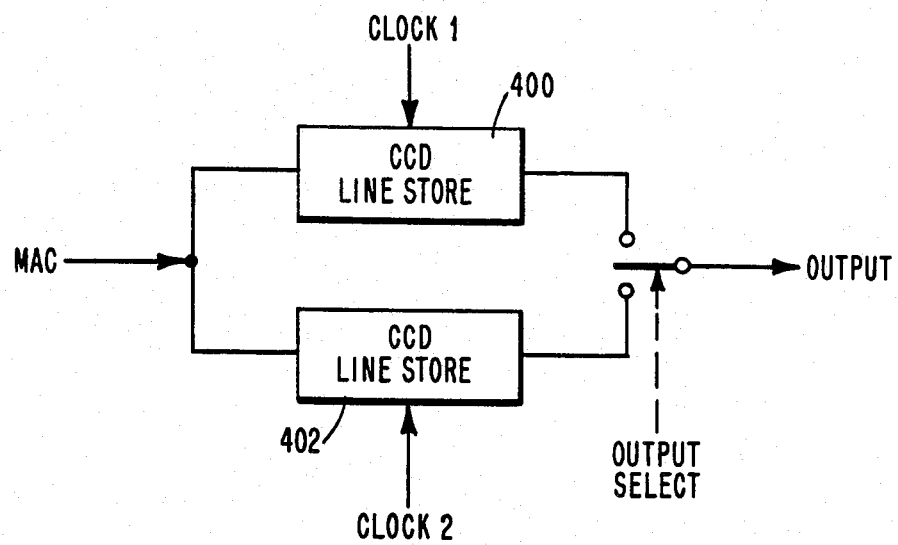
FIG. 7 is a diagram of a line store which may be used to compress or decompress luminance or chrominance samples.
Figure 8:
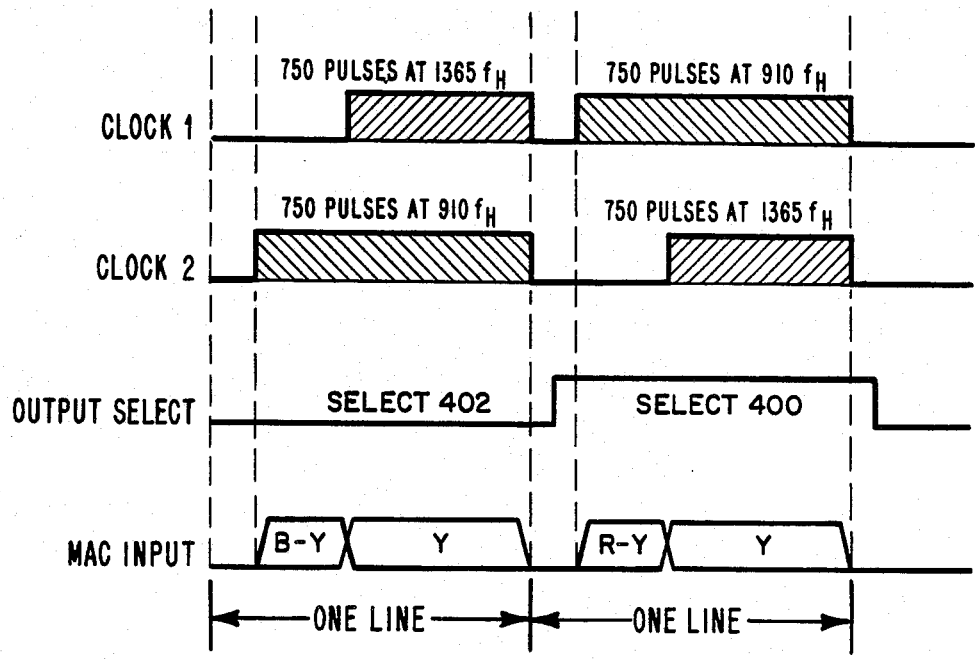
FIG. 8 is a diagram illustrating the signals input to and output from the line store of FIG. 7 during a luminance decompression operation.

FIG. 7 is a diagram of a line store which may be used to compress to decompress luminance or chrominance. This line store is representative of the storage devices 110a, 110b in FIG. 4 and 302, 312 in FIG. 6. The line store is described as performing luminance decompression. FIG. 8 is a diagram illustrating the signals input to and output from the line store of FIG. 7 during the luminance decompression operation. As the MAC television signal arrives, clock 1 writes the 750 luminance samples into line store 400 at the MAC sampling frequency of 1365 $f_H$. At the same time, clock 2 is causing the contents of line store 402 to be read onto the output line at the rate of 910 $f_H$. During the next video line, the 750 luminance samples are written into line store 402 by clock 2, operating at 1365 $f_H$. At the same time, the luminance samples stored in line store 400 are read to the output line by clock 1, at 910 $f_H$. A similar operation is used to decompress the chrominance samples, the clocks there alternating between 1365 $f_H$ and 455 $f_H$.

Although illustrative embodiments of the present invention have been described in detail with reference to the accompanying drawings, it is to be understood that the invention is not limited to those precise embodiments and that various changes and modifications may be effected therein by one skilled in the art without departing from the scope or spirit of the invention.

I claim:

1. An encoder to convert a television signal including luminance and chrominance information to a Multiplexed Analog Component (MAC) television signal for further conversion by a decoder to a composite television signal, said encoder comprising:

sampling means for sampling the luminance information at a frequency $f_1$ and sampling the chrominance information at a frequency $f_2$;

compression means for changing the frequency of the luminance and chrominance samples to a frequency $f_4$;

multiplex means for combining the compressed luminance and chrominance samples into the MAC television signal;

a master clock to generate a master clock signal having a frequency $f_0$; and dividing means for supplying to said sampling means and said compression means signals at frequencies $f_1$, $f_2$, and $f_4$, derived from the master clock signal; wherein $$(f_0/n) = (3f_1/2) = 3f_2 = f_4 = 227.5k\, f_H,$$

where n and k are positive integers.

2. An encoder as claimed in claim 1 where n=2 and k=6.

3. An encoder as claimed in claim 1 further comprising means for receiving teletext information, said multiplexer means combining the teletext information into the MAC television signal.

4. An encoder as claimed in claim 1 wherein the television signal is accompanied by audio information, said sampling means samples the audio information at a frequency $f_3$, said compression means changes the frequency of the audio samples, and said multiplex means combines the compressed audio samples into the MAC television signal, said dividing means supplying to said sampling means a signal derived from the master clock signal at frequency $f_3$ where $(f_0/n) = 65f_3$.

5. An encoder as claimed in claim 1 wherein the television signal is accompanied by audio information, said sampling means samples the audio information at a frequency $f_3$, said compression means changes the frequency of the audio samples, and said multiplex means combines the compressed audio samples into the MAC television signal, said dividing means supplying to said sampling means a signal derived from the master clock signal at frequency $f_3$ where $(f_0/n) = 105f_3$.

6. A decoder to convert a Multiplexed Analog Component (MAC) television signal, having luminance and chrominance samples occurring at a frequency $f_4$, to a composite television signal, said decoder comprising:

demultiplex means for separating the luminance and chrominance samples from the MAC television signal;

decompression means for changing the frequency of the separated luminance samples to a frequency $f_1$ and changing the frequency of the separated chrominance samples to a frequency $f_2$;

color modulator means for modulating a 227.5 $f_H$ subcarrier with the decompressed chrominance samples;

output means for combining the decompressed luminance samples and the modulated subcarrier into the NTSC television signal;

a master clock to generate a master clock signal having a frequency $f_0$; and dividing means for supplying to said decompression means and said color modulator means signals at frequencies $f_1$, $f_2$, $f_4$, and 227.5 $f_H$, derived from the master clock signal; wherein $$(f_0/n) = (3f_1/2) = 3f_2 = f_4 = 227.5k\, f_H,$$

where n and k are positive integers.

7. A decoder as claimed in claim 6 where n=2 and k=6.

8. A decoder as claimed in claim 6 wherein the MAC television signal includes teletext information and said demultiplex means separates the teletext information from the MAC television signal, said decoder further comprising a teletext character generator connected to said output means to produce teletext characters at a frequency $f_5$ from the teletext information, said output means combining the teletext characters with the composite television signal, said dividing means supplying to said teletext character generator a signal derived from the master clock signal at frequency $f_5$ where $(f_0/n)=3\frac{1}{2}f_5$.

9. An encoder as claimed in claim 1 wherein
$f_0=42.96$ MHz,
$f_1=14.32$ MHz,
$f_2=7.16$ MHz,
$f_3=0.33$ MHz, and
$f_4=21.48$ MHz.

10. An encoder as claimed in claim 1 wherein
$f_0=42.96$ MHz,
$f_1=14.32$ MHz,
$f_2=7.16$ MHz,
$f_3=0.20$ MHz, and
$f_4=21.48$ MHz.

11. A decoder as claimed in claim 6 wherein
$f_0=42.96$ MHz,
$f_1=14.32$ MHz,
$f_2=7.16$ MHz,
$f_3=0.33$ MHz, and
$f_4=21.48$ MHz.

12. A decoder as claimed in claim 6 wherein
$f_0=42.96$ MHz,
$f_1=14.32$ MHz,
$f_2=7.16$ MHz,
$f_3=0.20$ MHz, and
$f_4=21.48$ MHz.

13. A decoder as claimed in claim 6 wherein the MAC television signal includes audio samples, said demultiplex means separates the audio samples from the MAC television signal, said decompression means changes the frequency of the audio samples to a frequency $f_3$, and said output means outputs the decompressed audio samples to accompany the composite television signal, said dividing means supplying to said decompression means a signal derived from the master clock signal at a frequency $f_3$ where $(f_0/n)=65f_3$.

14. A decoder as claimed in claim 6 wherein the MAC television signal includes audio samples, said demultiplex means separates the audio samples from the MAC television signal, said decompression means changes the frequency of the audio samples to a frequency $f_3$, and said output means outputs the decompressed audio samples to accompany the composite television signal, said dividing means supplying to said decompression means a signal derived from the master clock signal at a frequency $f_3$ where $(f_0/n)=105f_3$.

15. An improved communication method for transmitting television signals including luminance and chrominance information and accompanied by audio information, the method having the old steps of sampling the luminance information at a frequency $f_1$, sampling the chrominance information at a frequency $f_2$, sampling the audio information at a frequency $f_3$, compressing the luminance and chrominance samples to a frequency $f_4$, compressing the audio samples, combining the luminance, chrominance and audio samples into a Multiplexed Analog Component (MAC) television signal, separating the luminance, chrominance and audio samples from the MAC television signal, decompressing the luminance samples to frequency $f_1$, decompressing the chrominance samples to frequency $f_2$, decompressing the audio samples to frequency $f_3$, modulating a 227.5 $f_H$ subcarrier with the decompressed chrominance samples, combining the decompressed luminance samples and the modulated subcarrier into a composite television signal, outputting the composite television signal accompanied by the decompressed audio samples, and generating a master clock signal having a frequency $f_0$, wherein the improvement comprises the steps of:

selecting $f_0$, $f_1$, $f_2$, $f_3$, and $f_4$ to satisfy the relationship $$(f_0/n)=(3f_1/2)=3f_2=65f_3=f_4=227.5k\,f_H,$$

where n and k are positive integers; and
dividing the master clock signal $f_0$ to obtain frequencies $f_1$, $f_2$, $f_3$, and $f_4$.

16. An apparatus for supplying signals at a plurality of frequencies in a communication system for transmitting television signals including luminance and chrominance information and accompanied by audio information, the communication system having as old elements sampling means for sampling the luminance information at a frequency $f_1$ and sampling the chrominance information at a frequency $f_2$, compression means for changing the frequency of the luminance and chrominance samples to a frequency $f_4$, multiplex means for combining the compressed luminance and chrominance samples into a Multiplexed Analog Component (MAC) television signal, demultiplex means for separating the luminance and chrominance samples from the MAC television signal, decompression means for changing the frequency of the separated luminance samples to frequency $f_1$ and changing the frequency of the separated chrominance samples to $f_2$, color modulator means for modulating a 227.5 $f_H$ subcarrier with the decompressed chrominance samples, and output means for combining the decompressed luminance samples and the modulated subcarrier into a composite television signal, wherein said apparatus comprises:

a master clock to generate a master clock signal having a frequency $f_0$; and
dividing means for supplying to said sampling means, compression means, decompression means, and color modulator means signals at frequencies $f_1$, $f_2$, $f_4$ and 227.5 $f_H$, derived from the master clock signal; wherein $$(f_0/n)=(3f_1/2)=3f_2=f_4=227.5\,kf_H$$

where n and k are positive integers.

* * * * *